(12) United States Patent
Jackson et al.

(10) Patent No.: US 11,686,195 B2
(45) Date of Patent: *Jun. 27, 2023

(54) DOWNHOLE SWITCH AND COMMUNICATION PROTOCOL

(71) Applicant: Acuity Technical Designs, LLC, Phoenix, AZ (US)

(72) Inventors: Roger Jackson, Glendale, AZ (US); Brian Keith Roper, Phoenix, AZ (US); Todd K. Roper, Glendale, AZ (US)

(73) Assignee: Acuity Technical Designs, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,456

(22) Filed: Mar. 7, 2022

(65) Prior Publication Data

US 2022/0195867 A1    Jun. 23, 2022

Related U.S. Application Data

(62) Division of application No. 16/367,101, filed on Mar. 27, 2019, now Pat. No. 11,268,376.

(51) Int. Cl.
| | | |
|---|---|---|
| *E21B 47/13* | (2012.01) | |
| *E21B 43/117* | (2006.01) | |
| *H04L 27/10* | (2006.01) | |

(52) U.S. Cl.
CPC ............ *E21B 47/13* (2020.05); *E21B 43/117* (2013.01); *H04L 27/10* (2013.01)

(58) Field of Classification Search
CPC ...... E21B 47/13; E21B 43/117; E21B 43/116; E21B 47/12; H04L 27/10; H04L 27/106
See application file for complete search history.

(56) References Cited

U.S. PATENT DOCUMENTS

| | | |
|---|---|---|
| 4,234,768 A | 11/1980 | Boop |
| 4,527,636 A | 7/1985 | Bordon |
| RE32,755 E | 9/1988 | Vann |
| 4,815,540 A | 3/1989 | Wallbillich, III |
| 4,829,901 A | 5/1989 | Yates, Jr. |
| 4,830,120 A | 5/1989 | Stout |
| 4,886,126 A | 12/1989 | Yates, Jr. |

(Continued)

FOREIGN PATENT DOCUMENTS

| | | |
|---|---|---|
| GB | 2442975 | 4/2008 |
| GB | 2513934 | 11/2014 |

(Continued)

OTHER PUBLICATIONS

Schlumberger Brochure, "ASFS Addressable-Switch Firing System," (2014).

*Primary Examiner* — Amine Benlagsir
(74) *Attorney, Agent, or Firm* — Snell & Wilmer L.L.P.

(57) ABSTRACT

A system includes a surface device, preferably positioned on a surface, a downhole device, and a wireline communications system. A downlink communication between the surface device and the downhole device occurs via Hopped Frequency Shift Keying (HFSK) voltage-modulated signals. An optional uplink communication between the downhole device and the surface device may occur via Frequency Shift Keying (FSK) current-modulated signals. The downhole device may comprise an addressable switch.

16 Claims, 5 Drawing Sheets

(56) References Cited

U.S. PATENT DOCUMENTS

| | | |
|---|---|---|
| 4,917,187 A | 4/1990 | Burns et al. |
| 4,949,793 A | 8/1990 | Rubbo et al. |
| 4,979,567 A | 12/1990 | Rubbo |
| 5,016,716 A | 5/1991 | Donovan et al. |
| 5,025,861 A | 6/1991 | Huber et al. |
| 5,044,441 A | 9/1991 | Rubbo et al. |
| 5,067,568 A | 11/1991 | Yates, Jr. et al. |
| 5,076,355 A | 12/1991 | Donovan et al. |
| 5,131,472 A | 7/1992 | Dees et al. |
| 5,156,213 A | 10/1992 | George et al. |
| 5,226,494 A | 7/1993 | Rubbo et al. |
| RE34,451 E | 11/1993 | Donovan et al. |
| 5,303,772 A | 4/1994 | George et al. |
| 5,320,176 A | 6/1994 | Naquin et al. |
| 5,327,974 A | 7/1994 | Donovan et al. |
| 5,346,014 A | 9/1994 | Ross |
| 5,370,186 A | 12/1994 | Ireland |
| 5,398,760 A | 3/1995 | George et al. |
| 5,462,117 A | 10/1995 | Green et al. |
| 5,526,880 A | 6/1996 | Jordan et al. |
| 5,611,401 A | 3/1997 | Myers et al. |
| 5,662,170 A | 9/1997 | Donovan et al. |
| 5,680,905 A | 10/1997 | Green et al. |
| 6,055,213 A | 4/2000 | Rubbo et al. |
| 6,105,688 A | 8/2000 | Vaynshteyn et al. |
| 6,142,231 A | 11/2000 | Myers et al. |
| 6,148,916 A | 11/2000 | Sampson et al. |
| 6,246,962 B1 | 6/2001 | Schultz et al. |
| 6,283,156 B1 | 9/2001 | Motley |
| 6,283,227 B1 | 9/2001 | Lerche et al. |
| 6,286,598 B1 | 9/2001 | van Petegem et al. |
| 6,295,912 B1 | 10/2001 | Burleson et al. |
| 6,296,066 B1 | 10/2001 | Terry et al. |
| 6,298,915 B1 | 10/2001 | George |
| 6,310,829 B1 | 10/2001 | Green et al. |
| 6,321,838 B1 | 11/2001 | Skinner |
| 6,325,146 B1 | 12/2001 | Ringgenberg et al. |
| 6,329,407 B1 | 12/2001 | Jähne et al. |
| 6,333,784 B1 | 12/2001 | Blasi et al. |
| 6,371,219 B1 | 4/2002 | Collins et al. |
| 6,378,438 B1 | 4/2002 | Lussier et al. |
| 6,414,905 B1 | 7/2002 | Owens et al. |
| 6,435,278 B1 | 8/2002 | Barlow et al. |
| 6,439,121 B1 | 8/2002 | Gillingham |
| 6,446,720 B1 | 9/2002 | Ringgenberg et al. |
| 6,450,258 B2 | 9/2002 | Green et al. |
| 6,459,383 B1 * | 10/2002 | Delatorre ............... G01V 11/00 166/250.11 |
| 6,487,973 B1 | 12/2002 | Gilbert, Jr. et al. |
| 6,494,260 B2 | 12/2002 | van Petegem et al. |
| 6,497,284 B2 | 12/2002 | van Petegem et al. |
| 6,536,350 B2 | 3/2003 | Cartland et al. |
| 6,564,866 B2 | 5/2003 | Clark et al. |
| 6,566,635 B1 | 5/2003 | Matsen et al. |
| 6,591,912 B2 | 7/2003 | Ross et al. |
| 6,595,290 B2 | 7/2003 | George et al. |
| 6,604,584 B2 | 8/2003 | Lerche et al. |
| 6,626,241 B2 | 9/2003 | Nguyen |
| 6,630,668 B1 | 10/2003 | Cramer et al. |
| 6,637,339 B1 | 10/2003 | Petzold et al. |
| 6,653,608 B1 | 11/2003 | Matsen et al. |
| 6,658,981 B2 | 12/2003 | Rochen et al. |
| 6,679,323 B2 | 1/2004 | Vargervik et al. |
| 6,679,327 B2 | 1/2004 | Sloan et al. |
| 6,684,954 B2 | 2/2004 | George |
| 6,708,761 B2 | 3/2004 | George et al. |
| 6,723,709 B1 | 4/2004 | Pressato et al. |
| 6,729,398 B2 | 5/2004 | Ringgenberg et al. |
| 6,736,984 B2 | 5/2004 | Golecki |
| 6,748,843 B1 | 6/2004 | Barker et al. |
| 6,758,124 B2 | 7/2004 | Barker et al. |
| 6,793,017 B2 | 9/2004 | Nguyen et al. |
| 6,820,693 B2 | 11/2004 | Hales et al. |
| 6,823,902 B2 | 11/2004 | Rudesill et al. |
| 6,843,318 B2 | 1/2005 | Yarbro |
| 6,843,320 B2 | 1/2005 | Yarbro |
| 6,851,471 B2 | 2/2005 | Barlow et al. |
| 6,877,561 B2 | 4/2005 | Richard et al. |
| 6,880,637 B2 | 4/2005 | Myers et al. |
| 6,920,933 B2 | 7/2005 | Watson et al. |
| 6,941,627 B2 | 9/2005 | Fritsche et al. |
| 6,944,095 B2 | 9/2005 | Thomas |
| 6,955,217 B2 | 10/2005 | Clark et al. |
| 7,000,699 B2 | 2/2006 | Yang et al. |
| 7,007,756 B2 | 3/2006 | Lerche et al. |
| 7,013,977 B2 | 3/2006 | Nordaas |
| 7,016,261 B2 | 3/2006 | Quinn et al. |
| 7,021,375 B2 | 4/2006 | Ringgenberg et al. |
| 7,044,236 B2 | 5/2006 | Iversen et al. |
| 7,066,261 B2 | 6/2006 | Vicente et al. |
| 7,073,579 B2 | 7/2006 | Ringgenberg et al. |
| 7,086,463 B2 | 8/2006 | Ringgenberg et al. |
| 7,116,542 B2 * | 10/2006 | Lerche ..................... F42B 3/12 361/120 |
| 7,172,023 B2 | 2/2007 | Barker et al. |
| 7,178,213 B2 | 2/2007 | Haas et al. |
| 7,210,524 B2 | 5/2007 | Sloan et al. |
| 7,229,701 B2 | 6/2007 | Madhava et al. |
| 7,231,982 B2 | 6/2007 | Sloan et al. |
| 7,237,486 B2 | 7/2007 | Myers, Jr. et al. |
| 7,237,487 B2 | 7/2007 | Myers, Jr. et al. |
| 7,243,725 B2 | 7/2007 | George et al. |
| 7,246,659 B2 | 7/2007 | Fripp et al. |
| 7,266,917 B2 | 9/2007 | Ryan et al. |
| 7,295,491 B2 | 11/2007 | Carstensen |
| 7,299,961 B2 | 11/2007 | Stavig, Jr. et al. |
| 7,303,017 B2 | 12/2007 | Barker et al. |
| 7,308,461 B2 | 12/2007 | Iwatsu |
| 7,322,416 B2 | 1/2008 | Burris et al. |
| 7,339,852 B2 | 3/2008 | Gordy et al. |
| 7,342,230 B2 | 3/2008 | Adamski |
| 7,360,487 B2 | 4/2008 | Myers, Jr. et al. |
| 7,387,156 B2 | 6/2008 | Drummond et al. |
| 7,395,987 B2 | 7/2008 | Lindquist et al. |
| 7,428,922 B2 | 9/2008 | Fripp et al. |
| 7,431,080 B2 | 10/2008 | Wright et al. |
| 7,526,850 B2 | 5/2009 | Haas et al. |
| 7,530,311 B2 | 5/2009 | Koekemoer et al. |
| 7,540,326 B2 | 6/2009 | Rytlewski |
| 7,556,695 B2 | 7/2009 | Strangman et al. |
| 7,565,927 B2 | 7/2009 | Gerez et al. |
| 7,575,702 B2 | 8/2009 | Obrachta |
| 7,581,498 B2 | 9/2009 | Hetz et al. |
| 7,591,212 B2 | 9/2009 | Myers, Jr. et al. |
| 7,595,633 B2 | 9/2009 | Martin et al. |
| 7,600,568 B2 | 10/2009 | Ross et al. |
| 7,602,827 B2 | 10/2009 | Okuda |
| 7,607,379 B2 | 10/2009 | Rospek et al. |
| 7,610,969 B2 | 11/2009 | LaGrange et al. |
| 7,624,807 B2 | 12/2009 | Vick, Jr. |
| 7,648,740 B2 | 1/2010 | Slaughter |
| 7,650,947 B2 | 1/2010 | Henke et al. |
| 7,665,529 B2 | 2/2010 | Farquhar et al. |
| 7,686,082 B2 | 3/2010 | Marsh |
| 7,710,545 B2 | 5/2010 | Cramblitt et al. |
| 7,721,649 B2 | 5/2010 | Hetz et al. |
| 7,721,820 B2 | 5/2010 | Hill et al. |
| 7,730,951 B2 | 6/2010 | Suijaatmadja et al. |
| 7,735,578 B2 | 6/2010 | Loehr et al. |
| 7,752,971 B2 | 7/2010 | Loehr |
| 7,757,767 B2 | 7/2010 | Hill et al. |
| 7,762,172 B2 | 7/2010 | Li et al. |
| 7,762,247 B2 | 7/2010 | Evans |
| 7,770,662 B2 | 8/2010 | Harvey et al. |
| 7,806,035 B2 | 10/2010 | Kaiser et al. |
| 7,810,552 B2 | 10/2010 | Slaughter |
| 7,828,051 B2 | 11/2010 | Walker |
| 7,829,011 B2 | 11/2010 | Slaughter |
| 7,857,066 B2 | 12/2010 | DiFoggio et al. |
| 7,861,609 B2 | 1/2011 | Haggerty et al. |
| 7,861,784 B2 | 1/2011 | Burleson et al. |
| 7,866,372 B2 | 1/2011 | Slaughter |
| 7,866,377 B2 | 1/2011 | Slaughter |
| 7,934,558 B2 | 5/2011 | Hales et al. |

(56) References Cited

U.S. PATENT DOCUMENTS

| | | |
|---|---|---|
| 7,942,098 B2 | 5/2011 | Han et al. |
| 7,946,344 B2 | 5/2011 | Braithwaite et al. |
| 7,955,568 B2 | 6/2011 | Ullman et al. |
| 7,980,308 B2 | 7/2011 | Myers, Jr. et al. |
| 7,980,309 B2 | 7/2011 | Crawford |
| 8,002,035 B2 | 8/2011 | Hales et al. |
| 8,006,427 B2 | 8/2011 | Blevins et al. |
| 8,006,762 B2 | 8/2011 | Burleson et al. |
| 8,035,370 B2 | 10/2011 | Jackson et al. |
| 8,061,425 B2 | 11/2011 | Hales et al. |
| 8,061,426 B2 | 11/2011 | Suijaatmadja |
| 8,061,431 B2 | 11/2011 | Moore et al. |
| 8,066,083 B2 | 11/2011 | Hales et al. |
| 8,074,737 B2 | 12/2011 | Hill et al. |
| 8,091,447 B2 | 1/2012 | Garabello et al. |
| 8,091,638 B2 | 1/2012 | Dusterhoft et al. |
| 8,127,846 B2 | 3/2012 | Hill et al. |
| 8,136,608 B2 | 3/2012 | Goodman |
| 8,143,119 B2 | 3/2012 | Sakoh et al. |
| 8,152,107 B1 | 4/2012 | Toombs |
| 8,157,022 B2 | 4/2012 | Bertoja et al. |
| 8,181,718 B2 | 5/2012 | Burleson et al. |
| 8,186,259 B2 | 5/2012 | Burleson et al. |
| 8,213,151 B2 * | 7/2012 | Nelson .................... F42B 35/00 701/45 |
| 8,223,591 B2 | 7/2012 | Chelminski |
| 8,230,946 B2 | 7/2012 | Crawford et al. |
| 8,256,337 B2 | 9/2012 | Hill et al. |
| 8,264,814 B2 | 9/2012 | Love et al. |
| 8,267,172 B2 | 9/2012 | Suijaatmadja et al. |
| 8,276,656 B2 | 10/2012 | Goodman |
| 8,286,697 B2 | 10/2012 | Evans et al. |
| 8,286,706 B2 | 10/2012 | McCann et al. |
| 8,307,743 B2 | 11/2012 | Hsu |
| 8,307,904 B2 | 11/2012 | Suijaatmadja |
| 8,336,437 B2 | 12/2012 | Barlow et al. |
| 8,347,962 B2 | 1/2013 | Sampson et al. |
| 8,365,376 B2 | 2/2013 | Reid et al. |
| 8,365,814 B2 | 2/2013 | Hill et al. |
| 8,369,063 B2 | 2/2013 | Vicente |
| 8,381,822 B2 | 2/2013 | Hales et al. |
| 8,387,226 B2 | 3/2013 | Weigel, Jr. et al. |
| 8,387,814 B2 | 3/2013 | Zheng |
| 8,393,392 B2 | 3/2013 | Mytopher et al. |
| 8,393,393 B2 | 3/2013 | Rodgers et al. |
| 8,408,285 B2 | 4/2013 | Lian et al. |
| 8,418,764 B2 | 4/2013 | Dusterhoft et al. |
| 8,424,606 B2 | 4/2013 | Zhan et al. |
| 8,439,114 B2 | 5/2013 | Parrott et al. |
| 8,490,686 B2 | 7/2013 | Rodgers et al. |
| 8,540,021 B2 | 9/2013 | McCarter et al. |
| 8,544,563 B2 | 10/2013 | Bourne et al. |
| 8,549,905 B2 | 10/2013 | Brooks et al. |
| 8,555,764 B2 | 10/2013 | Van Le et al. |
| 8,576,090 B2 | 11/2013 | Lerche et al. |
| 8,584,763 B2 | 11/2013 | Hales et al. |
| 8,596,378 B2 | 12/2013 | Mason et al. |
| 8,597,076 B2 | 12/2013 | Krienke et al. |
| 8,607,863 B2 | 12/2013 | Fripp et al. |
| 8,672,031 B2 | 3/2014 | Vaynshteyn |
| 8,678,261 B2 | 3/2014 | Lee |
| 8,689,868 B2 | 4/2014 | Lerche et al. |
| 8,695,506 B2 | 4/2014 | Lanclos |
| 8,714,251 B2 | 5/2014 | Glenn et al. |
| 8,714,252 B2 | 5/2014 | Glenn et al. |
| 8,716,627 B2 | 5/2014 | Saunders et al. |
| 8,728,245 B2 | 5/2014 | Dufresne et al. |
| 8,739,673 B2 | 6/2014 | Van Le et al. |
| 8,740,071 B1 | 6/2014 | Higgs et al. |
| 8,746,331 B2 | 6/2014 | Kash et al. |
| 8,790,587 B2 | 7/2014 | Singh et al. |
| 8,794,326 B2 | 8/2014 | Le et al. |
| 8,794,335 B2 | 8/2014 | Fadul et al. |
| 8,807,003 B2 | 8/2014 | Van Le et al. |
| 8,807,206 B2 | 8/2014 | Walker |
| 8,807,210 B2 | 8/2014 | Smith et al. |
| 8,807,213 B2 | 8/2014 | Walket et al. |
| 8,831,739 B2 | 9/2014 | McCreery et al. |
| 8,839,863 B2 | 9/2014 | Hetz et al. |
| 8,839,873 B2 | 9/2014 | Johnson et al. |
| 8,844,625 B2 | 9/2014 | Mhaskar et al. |
| 8,851,160 B2 | 10/2014 | Stolboushkin |
| 8,875,796 B2 | 11/2014 | Hales et al. |
| 8,881,816 B2 | 11/2014 | Glenn et al. |
| 8,884,778 B2 | 11/2014 | Lerche et al. |
| 8,893,605 B1 | 11/2014 | Hester, Jr. et al. |
| 8,893,785 B2 | 11/2014 | Skinner et al. |
| 8,899,322 B2 | 12/2014 | Cresswell et al. |
| 8,899,346 B2 | 12/2014 | Dagenais et al. |
| 8,910,556 B2 | 12/2014 | Umphries et al. |
| 8,910,713 B2 | 12/2014 | Zuklic et al. |
| 8,910,716 B2 | 12/2014 | Newton et al. |
| 8,919,236 B2 | 12/2014 | Bell et al. |
| 8,919,253 B2 | 12/2014 | Sampson et al. |
| 8,919,443 B2 | 12/2014 | Parker et al. |
| 8,931,389 B2 | 1/2015 | Brooks et al. |
| 8,943,943 B2 | 2/2015 | Tassaroli |
| 8,960,288 B2 | 2/2015 | Sampson |
| 8,960,289 B2 | 2/2015 | Zhang et al. |
| 8,963,827 B2 | 2/2015 | Kim et al. |
| 8,965,044 B1 | 2/2015 | Owechko |
| 8,967,257 B2 | 3/2015 | Fadul et al. |
| 8,971,152 B2 | 3/2015 | Chelminski |
| 8,978,749 B2 | 3/2015 | Rodgers et al. |
| 8,985,023 B2 | 3/2015 | Mason |
| 8,985,200 B2 | 3/2015 | Rodgers et al. |
| 8,991,496 B2 | 3/2015 | Bishop |
| 9,004,185 B2 | 4/2015 | Madero et al. |
| 9,027,456 B2 | 5/2015 | Mhaskar |
| 9,062,534 B2 | 6/2015 | Evans et al. |
| 9,068,411 B2 | 6/2015 | O'Connor et al. |
| 9,068,449 B2 | 6/2015 | Suijaatmadja |
| 9,080,431 B2 | 7/2015 | Bell et al. |
| 9,080,433 B2 | 7/2015 | Lanclos et al. |
| 9,086,085 B2 | 7/2015 | Lubchansky et al. |
| 9,091,152 B2 | 7/2015 | Rodgers et al. |
| 9,115,572 B1 | 8/2015 | Hardesty et al. |
| 9,121,265 B2 | 9/2015 | Myers et al. |
| 9,133,695 B2 | 9/2015 | Xu |
| 9,134,170 B2 | 9/2015 | Mefford et al. |
| 9,145,763 B1 | 9/2015 | Sites, Jr. |
| 9,146,295 B2 | 9/2015 | Jiang et al. |
| 9,157,718 B2 | 10/2015 | Ross |
| 9,174,381 B1 | 11/2015 | Morales |
| 9,175,553 B2 | 11/2015 | McCann et al. |
| 9,187,990 B2 | 11/2015 | Xu |
| 9,194,219 B1 | 11/2015 | Hardesty et al. |
| 9,200,487 B2 | 12/2015 | Draper et al. |
| 9,206,675 B2 | 12/2015 | Hales et al. |
| 9,217,305 B2 | 12/2015 | Coles et al. |
| 9,222,339 B2 | 12/2015 | Mason et al. |
| 9,238,956 B2 | 1/2016 | Martinez |
| 9,272,337 B2 | 3/2016 | Steppan et al. |
| 9,284,819 B2 | 3/2016 | Tolman et al. |
| 9,284,824 B2 | 3/2016 | Fadul et al. |
| 9,291,040 B1 * | 3/2016 | Hardesty ................. F42D 1/04 |
| 9,297,228 B2 | 3/2016 | Martinez et al. |
| 9,310,284 B2 | 4/2016 | Grahma et al. |
| 9,366,372 B2 | 6/2016 | Nakazono et al. |
| 9,382,783 B2 | 7/2016 | Langford et al. |
| 9,394,767 B2 | 7/2016 | Brooks et al. |
| 9,428,988 B2 | 8/2016 | Frazier |
| 9,441,438 B2 | 9/2016 | Allison et al. |
| 9,446,444 B2 | 9/2016 | Christensen et al. |
| 9,447,678 B2 | 9/2016 | Walter et al. |
| 9,476,289 B2 | 10/2016 | Wells |
| 9,476,290 B2 | 10/2016 | Umphries et al. |
| 9,488,024 B2 | 11/2016 | Hoffman et al. |
| 9,506,317 B2 | 11/2016 | Craig et al. |
| 9,506,333 B2 | 11/2016 | Castillo et al. |
| 9,518,454 B2 | 12/2016 | Current et al. |
| 9,520,219 B2 | 12/2016 | LaGrange et al. |
| 9,520,249 B2 | 12/2016 | Bonavides |
| 9,523,271 B2 | 12/2016 | Bonavides et al. |

(56) References Cited

U.S. PATENT DOCUMENTS

| | | |
|---|---|---|
| 9,528,360 B2 | 12/2016 | Castillo et al. |
| 9,530,581 B2 | 12/2016 | Bonavides et al. |
| 9,534,484 B2 | 1/2017 | Wright et al. |
| 9,535,015 B2 | 1/2017 | Isomura |
| 9,540,913 B2 | 1/2017 | Moore |
| 9,540,919 B2 | 1/2017 | Castillo et al. |
| 9,545,697 B2 | 1/2017 | Whinnem et al. |
| 9,557,212 B2 | 1/2017 | Xia et al. |
| 9,562,364 B1 | 2/2017 | Lehr |
| 9,562,421 B2 | 2/2017 | Hardesty et al. |
| 9,562,736 B2 | 2/2017 | Grossnickle et al. |
| 9,581,422 B2 | 2/2017 | Preiss et al. |
| 9,593,548 B2 | 3/2017 | Hill et al. |
| 9,593,560 B2 | 3/2017 | Mailand et al. |
| 9,598,940 B2 | 3/2017 | Rodgers et al. |
| 9,598,941 B1 | 3/2017 | Upchurch et al. |
| 9,605,937 B2 | 3/2017 | Eitschberger et al. |
| 9,606,214 B2 | 3/2017 | Kelchner et al. |
| 9,611,709 B2 | 4/2017 | O'Malley |
| 9,617,814 B2 | 4/2017 | Seals et al. |
| 9,625,226 B2 | 4/2017 | Lee et al. |
| 9,631,462 B2 | 4/2017 | Tirado et al. |
| 9,649,682 B2 | 5/2017 | Keener |
| 9,650,857 B2 | 5/2017 | Mailand et al. |
| 9,677,363 B2 | 6/2017 | Schacherer et al. |
| 9,689,223 B2 | 6/2017 | Schacherer et al. |
| 9,689,237 B2 | 6/2017 | Johnson et al. |
| 9,689,238 B2 | 6/2017 | Hardesty et al. |
| 9,689,239 B2 | 6/2017 | Hardesty |
| 9,695,646 B2 | 7/2017 | Grice |
| 9,702,029 B2 | 7/2017 | Fripp et al. |
| 9,708,894 B2 | 7/2017 | Ditzler et al. |
| 9,719,339 B2 | 8/2017 | Richard et al. |
| 9,725,993 B1 | 8/2017 | Yang et al. |
| 9,745,836 B2 | 8/2017 | Zevenbergen et al. |
| 9,745,847 B2 | 8/2017 | Ditzler |
| 9,750,162 B2 | 8/2017 | Szarek |
| 9,752,423 B2 | 9/2017 | Lynk |
| 9,759,049 B2 | 9/2017 | Hardesty et al. |
| 9,759,356 B2 | 9/2017 | Ott et al. |
| 9,765,601 B1 | 9/2017 | Yang et al. |
| 9,776,767 B2 | 10/2017 | DeJesus et al. |
| 9,789,506 B2 | 10/2017 | Kosta |
| 9,803,455 B1 | 10/2017 | Yang et al. |
| 9,810,036 B2 | 11/2017 | Mailand et al. |
| 9,810,047 B2 | 11/2017 | Filyukov et al. |
| 9,816,791 B2 | 11/2017 | Erickson et al. |
| 9,822,618 B2 | 11/2017 | Eitschberger |
| 9,823,053 B1 | 11/2017 | Fink |
| 9,833,838 B2 | 12/2017 | Mazyar et al. |
| 9,835,015 B2 | 12/2017 | Hardesty et al. |
| 9,839,889 B2 | 12/2017 | Quinto |
| 9,841,253 B2 | 12/2017 | Anthony |
| 9,845,666 B2 | 12/2017 | Hardesty et al. |
| 9,851,191 B2 | 12/2017 | Lerche et al. |
| 9,855,229 B2 | 1/2018 | Khairatkar-Joshi et al. |
| 9,856,411 B2 | 1/2018 | Sadana et al. |
| 9,869,160 B2 | 1/2018 | Onuoha |
| 9,870,048 B2 | 1/2018 | Yamazaki |
| 9,874,062 B2* | 1/2018 | Lajesic ............. E21B 23/0411 |
| 9,879,492 B2 | 1/2018 | Kitzman |
| 9,896,915 B2 | 2/2018 | Balun et al. |
| 9,914,165 B2 | 3/2018 | Erickson |
| 9,925,628 B2 | 3/2018 | Drexler |
| 9,926,777 B2 | 3/2018 | Rodgers et al. |
| 9,938,789 B2 | 4/2018 | Silva et al. |
| 9,951,589 B2 | 4/2018 | Wilson |
| 9,963,231 B2 | 5/2018 | Chattopadhyay |
| 9,988,898 B2 | 6/2018 | McColphin |
| 9,989,512 B2 | 6/2018 | Haggerty |
| 10,035,287 B2 | 7/2018 | Song |
| 10,465,462 B2 | 11/2019 | Frazier et al. |
| 10,689,955 B1 | 6/2020 | Mauldin et al. |
| 10,767,453 B2 | 9/2020 | Phelps et al. |
| 10,830,566 B2 | 11/2020 | Maxted et al. |
| 11,078,762 B2 | 8/2021 | Mauldin et al. |
| 2002/0163441 A1* | 11/2002 | Hill ..................... E21B 47/13 |
| | | 340/854.3 |
| 2003/0047358 A1 | 12/2003 | Bonkowski |
| 2005/0001734 A1* | 1/2005 | Miller ................. E21B 47/12 |
| | | 340/853.1 |
| 2015/0000509 A1 | 1/2015 | Current et al. |
| 2015/0167451 A1* | 6/2015 | Weerasinghe ........ E21B 47/12 |
| | | 340/855.9 |
| 2016/0115753 A1* | 4/2016 | Frazier ............... E21B 43/1185 |
| | | 166/66.4 |
| 2016/0230546 A1* | 8/2016 | Braisher .............. E21B 47/13 |
| 2016/0369622 A1* | 12/2016 | Wheeler .............. E21B 47/12 |
| 2017/0009559 A1 | 1/2017 | Spring et al. |
| 2017/0159420 A1 | 6/2017 | Tolman et al. |
| 2017/0211363 A1 | 7/2017 | Bradley |
| 2018/0019529 A1 | 5/2018 | Goyeneche |
| 2019/0112917 A1* | 4/2019 | Disko ..................... G01V 3/30 |
| 2019/0309608 A1 | 10/2019 | Phelps et al. |
| 2020/0018584 A1 | 1/2020 | Phelps et al. |
| 2020/0088026 A1* | 3/2020 | Buternowsky ........ H04L 27/206 |
| 2020/0109624 A1 | 4/2020 | Parasram et al. |
| 2020/0225014 A1 | 7/2020 | Maxted et al. |
| 2021/0048284 A1 | 2/2021 | Maxted et al. |

FOREIGN PATENT DOCUMENTS

| | | |
|---|---|---|
| WO | 200020820 | 4/2000 |
| WO | 2015052509 | 4/2015 |
| WO | 2016186611 | 11/2016 |

* cited by examiner

DOWNHOLE SWITCH AND COMMUNICATION PROTOCOL

CROSS REFERENCED TO RELATED APPLICATION

This application is a divisional of, and claims priority to U.S. patent application Ser. No. 16/367,101, filed Mar. 27, 2019, and entitled "Downhole Safety Switch and Communication Protocol" the contents of which is incorporated herein by reference in its entirety.

FIELD OF INVENTION

The present invention relates to addressable communications, including those for wireline perforating of wellbores.

BACKGROUND

The disclosures of the following U.S. patent applications are incorporated by reference into this application: (1) U.S. application Ser. No. 16/293,492 entitled Downhole Plunger and Subassembly and filed on Mar. 5, 2019, (2) U.S. application Ser. No. 16/293,508 entitled Downhole Perforating Gun Tube and Components and filed on Mar. 5, 2019, (3) U.S. application Ser. No. 16/293,522 entitled End Fitting For Downhole Perforating Gun Tube and filed on Mar. 5, 2019, (4) U.S. application Ser. No. 16/293,528 entitled Double Wire Feed Through For Downhole Subassembly and filed on Mar. 5, 2019, and (5) U.S. application Ser. No. 16/293,532 entitled Intelligent Downhole Perforating Gun Tube and Components and filed on Mar. 5, 2019. The inventors for each of applications (1)-(5), above, are Dawna Mauldin, Ronald Haasl, and Keith Roper.

When drilling oil or gas wells, a wellbore is formed. The wellbore may be horizontal or lateral. After drilling, the drill string and bit are removed and the remaining wellbore is lined with a metal casing. A generally annular area is typically formed between the outside surface of the metal casing and the surrounding formations.

A cementing operation is typically conducted to fill the area between the metal casing and the surrounding formation with concrete. The combination of concrete and metal casing strengthens the wellbore.

Later, perforations are usually made in the metal casing and concrete using a perforating gun assembly that is generally comprised of a steel carrier, and a charge tube inside of the carrier with shape charges positioned in the charge tube. The perforating gun is positioned into the wellbore and is typically connected to an electric wireline until it is at a predetermined position. Then a signal actuates a firing head of the gun, which detonates the shaped charges in the gun. The explosion of the shaped charges perforates the metal casing and concrete to allow fluids to flow from the formation into the wellbore.

SUMMARY

A system, method, and devices related to wireline perforating of wellbores is disclosed herein. The system comprises a control device that is preferably on the surface (which is sometimes referred to herein as "surface device, even though it need not be positioned on the surface), a downhole device, and a wireline communications system. The downlink communication between the surface device and the downhole device may occur via Hopped Frequency Shift Keying (HFSK) voltage-modulated signals.

The surface device may comprise a controller configured to send downlink communication signals to a downhole device. The controller may be a master controller. The surface device may be a master controller, wherein the downhole device is a slave. Downlink communication between the surface device and the downhole device may occur via Hopped Frequency Shift Keying (HFSK) voltage-modulated signals.

The uplink communication between the downhole device and the surface device may occur via Frequency Shift Keying (FSK) current-modulated signals. The downhole device may comprise an addressable switch. The downhole device may be a gun tube comprising one or more shape charges, one or more detonators, and one or more addressable switches. The wireline communication system may be a half-duplex. The wireline communications system may comprise a single wire downhole and a case or chassis for a return current path. The downlink communication may use voltage modulation at four different frequencies. A transport layer may comprise a bit-stream with a Preamble, Sync, and Data Packet, wherein the Data Packet consists of Type, Address, Sequence, Command, Data, and Hash fields, and wherein the Command comprises one of the following: request device ID and version; Poll device for status; Downstream Switch Enable (DSSE); ARM Detonator; and FIRE. The HFSK may alternate between four frequencies, F1, F2, F3, and F4, with a change in frequency indicating a new bit, and wherein frequencies F1 and F2 are utilized for a Zero bit, and wherein frequencies F3 and F4 are utilized for a One bit, excepting during the Preamble and Sync patterns.

An addressable switch is disclosed herein, which may be utilized in applications other than the perforating of wellbores. The addressable switch preferably comprises an electrical input and an electrical output, a downstream switch, a safety circuitry, and a processor. The electrical input may be configured to communicate with a controller, which is preferably above the surface of the ground, when a unique address is received by the electrical input from the surface device. The downstream switch may be configured to connect or disconnect to the electrical output when a command with the unique address is received by the electrical input. The processor may be in electrical communication with the downstream switch and the safety circuitry. The processor may be configured to send a signal to the safety circuitry to arm a detonator. Downlink communication between the surface device and the electrical input occur via voltage-modulated signals, preferably via Hopped Frequency Shift Keying (HFSK) voltage-modulated signals.

The downlink communication preferably uses voltage modulation at four different frequencies. A transport layer may comprise a bit-stream with a Preamble, Sync, and Data Packet, wherein the Data Packet consists of Type, Address, Sequence, Command, Data, and Hash fields, wherein the HFSK alternates between four frequencies, F1, F2, F3, and F4, with a change in frequency indicating a new bit, and wherein the Command comprises one of the following: request device ID and version; Poll device for status; Downstream Switch Enable (DSSE); ARM Detonator; and FIRE. The frequencies F1 and F2 may be utilized for a Zero bit. Frequencies F3 and F4 may be utilized for a One bit, except during the Preamble and Sync patterns. The addressable switch may further comprise an oscillator configured to be tuned to a reference signal, where the preamble provides the reference signal based on a minimum frequency deviation from a plurality of frequency deviations between an expected frequency from a surface controller and an internally generated frequency in the oscillator.

In various embodiments, the downlink communication uses voltage modulation at four different frequencies. A transport layer may comprise a bit-stream with a Preamble, Sync, and Data Packet, wherein the Data Packet consists of Type, Address, Sequence, Command, Data, and Hash fields. The HFSK may alternate between four frequencies, F1, F2, F3, and F4, with a change in frequency indicating a new bit, wherein frequencies F1 and F2 are utilized for a Zero bit, and wherein frequencies F3 and F4 are utilized for a One bit, except during the Preamble. The Command may comprise one of the following: request device ID and version; Poll device for status; Downstream Switch Enable (DSSE); ARM Detonator; and FIRE.

DETAILED DESCRIPTION OF PREFERRED EMBODIMENTS

Figure 1:
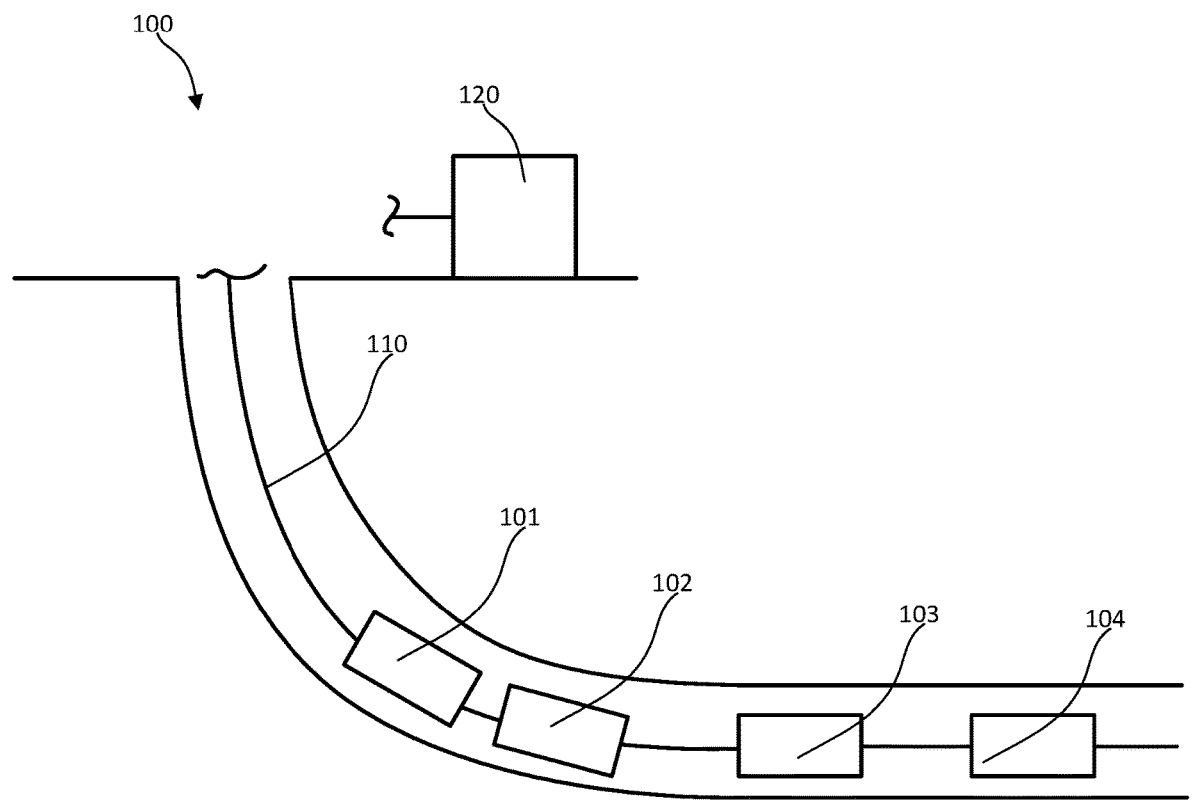
FIG. 1 is a side view of a well boring system in accordance with aspects of the invention.

Turning now to the drawings, where the purpose is to describe embodiments of this disclosure and not to limit the claims, FIG. 1 shows a well boring system 100.

Downhole Drilling

In an example well boring operation, a well boring system 100 comprises a surface device 120 that communicates with a downhole device 101 via a wireline communication system 110. In this example embodiment, downlink communication between surface device 120 and downhole device 101 occurs via Hopped Frequency Shift Keying (HFSK) voltage-modulated signals. In a further example embodiment, uplink communication between downhole device 101 and surface device 120 occurs via Frequency Shift Keying (FSK) current-modulated signals.

Surface Device

In this example embodiment, surface device 120 may be physically located above the surface of the ground, whereas downhole device 101 may be configured to be positioned in a well bore, although it may be at any suitable position and even below the surface level. Surface device 120 may comprise a surface controller. In an example embodiment, the surface device 120 operates as a master controller and the downhole devices (e.g., 101, 102, 103, 104) are slave nodes.

In an example embodiment, the surface device 120 is configured to send downlink communication signals to downhole device 101. The downlink communications signals may comprise such commands as: identify, status, enable switch, ARM detonator, and FIRE detonator. Moreover, the downlink communication signals may comprise any suitable commands, queries, or otherwise. In another example embodiment, the surface device 120 is configured to receive uplink communications signals from the downhole device 101 such as: temperature data, device identification and version, status information, acknowledgements of commands, and/or the like, although such uplink communication signals need not be sent. In an example embodiment, surface device 120 can comprise a single device or several devices. For example, surface device 120 may comprise a low power only surface box, a third-party controller with a combined shooting panel, or the like. In an example embodiment, the surface device 120 is configured to control and provide power to both a tractor and a gun (i.e., shooting power). In this example embodiment, the system 100 is preferably configured to prevent these power sources from being applied accidently.

Downhole Device

In one example embodiment, downhole device 101 may be a gun tube for performing wireline perforation in boring operations. The gun tube is preferably cylindrical and formed of steel. In this embodiment, the gun tube may comprise a tube body including a shape charge and a detonator. For example, downhole device 101 may comprise an exploding-bridgewire detonator (EBD)(fired using an electric current), exploding foil initiator detonator (EFD), and Rig Environment Detonator (RED). The downhole device 101 may comprise an initiator such as an exploding foil "flyer plate" initiator, exploding foil "bubble activated" initiator, semiconductor bridge initiator (SCB), or the like.

Downhole device 101 may instead be other devices such as a setting tool, retrieving tool, a plugging operation, and the like. Other downhole devices that may be used include smart devices, components, or intelligent tools, such as a Casing Collar Locator (CCL) logging tool, a temperature logging tool, a pressure logging tool, a gamma ray logging tool, a neutron logging tool, a radioactive tracer tool, a pulse tool type production logging tool, a gravel pack logging tool, etc.

In an example embodiment, system 100 may comprise more than one downhole device. For example, system 100 may comprise downhole device 101, downhole device 102, downhole device 103, and downhole device 104. Moreover, system 100 may comprise any suitable number of downhole devices. In embodiments with multiple downhole devices, the downhole devices may be connected physically, and/or electrically, in series. This series of downhole devices is also referred to herein as a toolstring. The toolstring may refer to the entire line of downhole devices and downstream toolstring may refer to a portion of an entire line of downhole devices, which portion is located below a specified point.

In an example embodiment, the downhole device 101 may be configured to receive downlink communication signals from surface device 120. The downlink communications signals may comprise such commands as: Identify, Status, Enable Switch, ARM Detonator, and FIRE Detonator. Moreover, the downlink communication signals may comprise any suitable commands, queries, or otherwise. In another example embodiment, the downhole device 101 may be configured to send any suitable uplink communications signals from the downhole device to the surface device 120, such as one or more of: temperature data, device identification and version, status information, acknowledgements of commands, and/or the like. This may provide a user with the advantage of obtaining downhole device data, while the downhole device 101 is below the surface. Downhole device 101 does not need to be removed from a wellbore to obtain this data.

Addressable Switch

Figure 3:
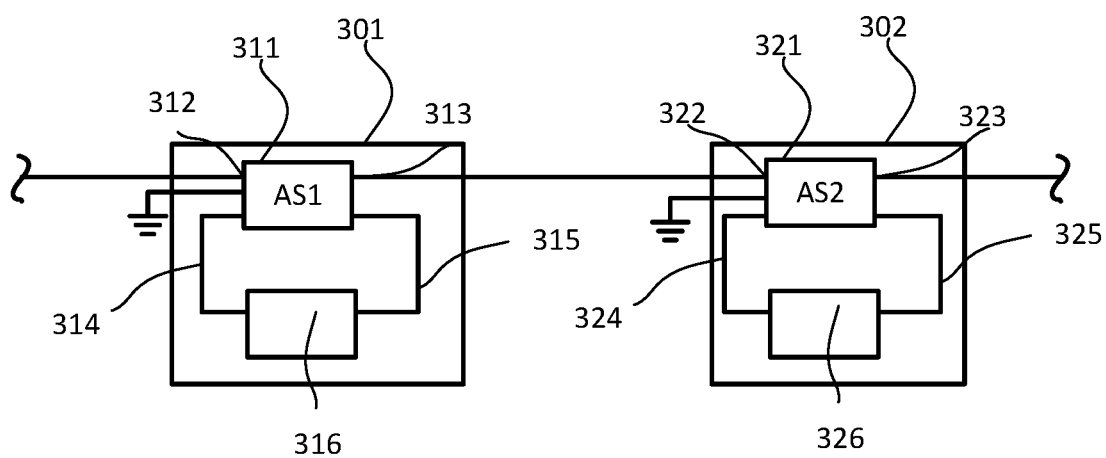
FIG. 3 is a diagram of first and second downhole devices.
Figure 4:
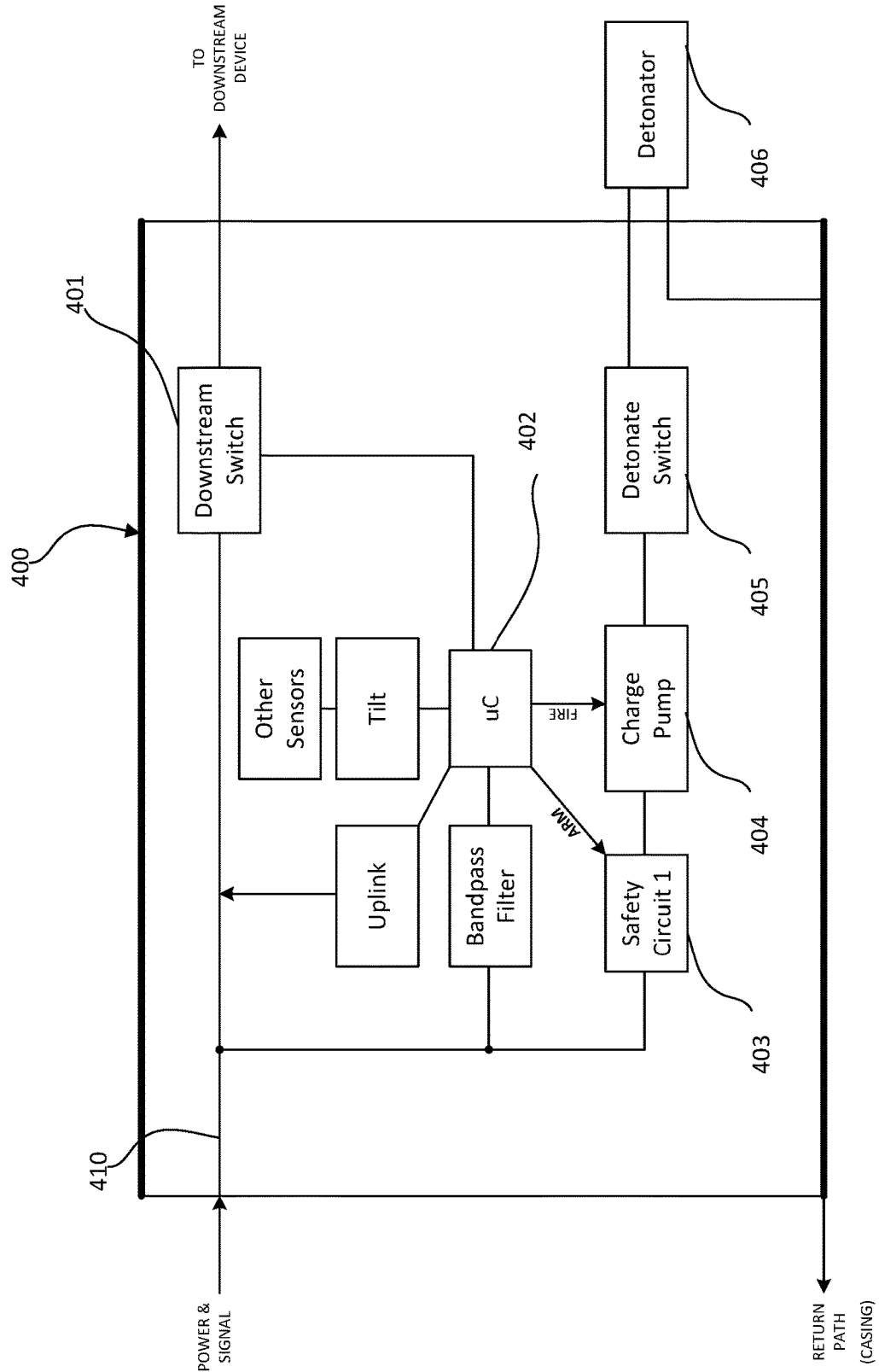
FIG. 4 is a block diagram of an example embodiment of an addressable switch.

In an example embodiment, the downhole device may comprise an addressable switch. The addressable switch may be configured to communicate with a controller located at any suitable position, and the controller is preferably surface device 120 for wellbore applications. The surface device 120 and the addressable switch are configured to communicate via a wire. With reference now to FIG. 3, in an example embodiment, a first downhole device 301 comprises a first addressable switch 311 and a first detonator 316, and a second downhole device 302 comprises a second addressable switch 321 and a second detonator 326. When a proper command is sent, the first addressable switch 311 may be configured to connect or disconnect the electrical feed-through to the second downhole device 302. In other words, the addressable switch may be configured to connect or disconnect the electrical communication path to the next downhole device in the wireline.

In an example embodiment, the first addressable switch 311 may have an electrical input 312 and an electrical output 313. Electrical input 312 may provide communication from surface device 120, as previously described. Electrical input 312 may receive a signal to command first addressable switch 311 to change from a 'blocking' state to a 'connecting' state. When the first addressable switch 311 is in a connecting state, it may provide an electrical path to the second downhole device 302, which as shown is downstream of first downhole device 301. The electrical path may extend from an electrical output 313 of first addressable switch 311 to an electrical input 322 of a second addressable switch 321. First addressable switch 311 may be configured to go into a sleeping mode when it is in a 'connecting' state. By having addressable switch 311 in a sleeping mode while it is in a 'connecting' state, the system may ensure that the surface device 120 is only communicating with one first addressable switch at a time. For example, when first addressable switch 311 is in a 'connecting' state, and the second addressable switch 321 is in a 'blocking state,' the surface device 120 may exclusively communicate with second downhole device 302. Alternatively, when first addressable switch 311 is in a 'blocking' state, the surface device 120 may exclusively communicate with first addressable switch 311.

When first addressable switch 311 is in a 'blocking state,' the surface device 120 communicates a detonate signal to the first addressable switch 311. Upon receiving a detonate signal, first addressable switch 311 detonates the detonator 316 via the positive terminal 314 and negative terminal 315. When first addressable switch 311 is in a 'connecting state,' the surface device 120 communicates a detonate signal to the second addressable switch 321. Upon receiving a detonate signal, second addressable switch 321 detonates the detonator 326 via the positive terminal 324 and negative terminal 325. In like manner, second addressable switch 321 may be configured to communicate with subsequent downstring addressable switches, such as a third addressable switch and/or fourth addressable switch, neither of which are shown in the figures.

As described above, the system 100 may comprise a line of downhole devices. In this example embodiment, each downhole device comprises its own addressable switch, and each addressable switch has a unique address and is configured to be uniquely identifiable (as explained further below) by transmitting a unique signal. In another example embodiment, the addressable switch is configured to be commanded individually by the surface device 120, and/or to reply back to the surface device 120. Each explosive charge in a gun tube may be associated with one addressable switch and that addressable switch's unique address.

Each addressable switch is preferably configured to safely manage downhole wireline shooting in the mining industry. If the downhole device is an explosive device, such as a gun tube, each downhole device may comprise at least one shaped charge, detonator, and an addressable switch.

The addressable switch preferably prevents the accidental application of power to any downhole device located beneath the addressable switch, and the addressable switch can be integrated into a variety of toolstring configurations. Toolstring configurations can include specific logging tools such as Casing Collar Locators (CCLs), Tension Tools, and the like. Thus, by addressing one of the addressable switches at its unique address, the other addressable switches are not addressed, which provides safety by not accidentally communicating with other than the intended addressable switch. The addressable switch may be configured to electrically connect or isolate the toolstring beneath it, as instructed by the surface device 120.

Communications Protocol

In accordance with an example embodiment, the system 100 comprises a wireline communications system. In this example embodiment, the downlink communication between surface device 120 and downhole device 101 (or multiple devices 101, 102, 103, 104, etc.) occurs via Hopped Frequency Shift Keying (HFSK) voltage-modulated signals. In a further example embodiment, uplink communication between the downhole device 101 (or multiple devices 101, 102, 103, 104, etc.) and the surface device 120 occurs via Frequency Shift Keying (FSK) current-modulated signals. In one example embodiment, the downlink and uplink communications are half-duplex. In another example embodiment, the wireline system can be either positive polarity or negative polarity. Thus, in an example embodiment, the addressable switch may be configured to perform safe and secure half-duplex communications with HFSK downlink and FSK uplink communications; perform enable/disable communications with lower downhole devices; and perform enable/disable detonator operations for firing.

The wireline communications system preferably comprises a single wire downhole and uses the casing or other metal structure of the downhole device as the return current path. Thus, the single wire downhole connects the surface device 120 and the downhole device 101 forming an electrical connection between the surface device 120 and the downhole device 101 and forming a return path through, for example, the metal casing of the downhole device.

Frequency Shift Keying (FSK)

In an example embodiment, the uplink signals are performed via 20 mA current modulation at the two frequencies of 2.0 KHz and 3.333 KHz. In this example embodiment, the time per bit is 3.0 mS, and the effective baud rate is 333 bps. In this example embodiment, the uplink communication is standard FSK with Manchester encoding and the frequencies are chosen such that a whole number of cycles exist within one-half bit time. However, any suitable FSK topology may be used.

Hopped Frequency Shift Keying (HFSK)

In an example embodiment, the downlink communication uses voltage modulation at four different frequencies, hereafter referred to as F1, F2, F3, and F4. Thus, the Hopped FSK (HFSK) alternates between four frequencies, F1, F2, F3, and F4, with a change in frequency indicating a new bit. In one embodiment, frequencies F1 and F2 are utilized for a Zero bit, and frequencies F3 and F4 are utilized for a One bit, except during the preamble and sync patterns at the start of the message. Although a four frequency communication protocol is disclosed herein, any suitable HFSK protocol may be used.

In one example embodiment, the frequencies utilized are 2.0 KHz, 2.4 KHz, 2.8 KHz, and 3.2 KHz. In this example embodiment, the time per bit is 2.5 mS, the effective baud rate is 400 bps, and the frequencies are chosen such that there are a multiple of full frequency cycles within one bit time. In this example, there are eight full cycles for the 3.2 KHz frequency, seven full cycles for the 2.8 KHz frequency, six full cycles for the 2.4 KHz frequency, and five full cycles for the 2.0 KHz frequency. Rather than using zero-crossing detection of the signal and determining the frequency via time between zero crossings, in an example embodiment a more advanced digital signal processing (DSP) technique may be used. The more advanced DSP technique may comprise using signal correlation, where ideal waveforms of the frequencies of interest are generated by the processor and compared to the incoming digitized waveform. In this example embodiment, an entire data bit, one for each frequency, is generated which comprises from 5 to 8 whole sinewave cycles per bit. The number of cycles in one data bit may depend on the frequency. In an example embodiment, a correlation value is obtained by multiplying the incoming waveform against one of the reference (internally generated) waveforms and summing the results of each point-by-point multiplication. By comparing the correlation values for each of the four possible frequencies, the actual incoming frequency, and therefore each bit value, can be determined. The correlation method is much more resilient to noise and signal reflections on the line than the simple zero-crossing method. In this example embodiment, a signal of at least 1.0 Vpp at the board may suffice for solid, reliable communication, and a signal over 5.0 Vpp is safely clipped to 5 volts.

Although HFSK protocol provides various benefits described herein, HFSK is much more difficult to implement than FSK, and requires changes to the transport plan. This difficulty is in part due to the high temperature variation (e.g., ranging from −55 C (−67 F) up to approximately 175 C or 347 F) experienced by the downhole device, which causes the oscillator in the downhole device to drift. Drift is acceptable with FSK because with FSK, the center frequency can be found rather simply, regardless of the drift, and the FSK system need only determine if received signal bits are above or below the center frequency to decode the 1's and 0's being transmitted. In contrast, with HFSK, the oscillator may need to be tuned to a reference signal. With HFSK, the center frequency is of little usefulness. Therefore, in an example embodiment, the first 8 bits, i.e., the preamble, provides the reference signal for adjusting the oscillator in the downhole device 101, underground, to match the oscillator in the surface device 120. In an example embodiment, the incoming signal is correlated against several internally-generated signals which have small frequency deviations from the expected F1 frequency. The deviation which best matches the incoming frequency indicates the difference between surface controller and downhole device oscillator frequencies. This difference may then be used to modify the sampling rate of the digitizing process, which causes the incoming signal to match the HFSK frequencies used in the downhole device. Moreover, any suitable method of tuning the local oscillator on the downhole device may be used.

In an example embodiment, HFSK communication increases the reliability of the communication. HFSK makes it more difficult to accidentally actuate the switch or to accidentally actuate the wrong switch. The use of four frequencies in the HFSK protocol increases the reliability of the communication. The four frequencies make possible the use of patterns in the selected communications or the device will not detonate.

Transport Layer

In accordance with various example embodiments, any suitable HFSK communication protocol may be implemented consistent with the present disclosure. However, by way of one example embodiment, a transport layer can be implemented as set forth herein. For example, the transport layer can comprise a bit-stream with a Preamble, Sync, and data Packet. In this example embodiment, the Packet may consist of Type, Address, Sequence, Command, Data, and Hash fields. In this example embodiment, the downlink message may begin with a preamble of 8 bits, a sync period of 4 bits, and the data packet may consist of eighteen (18) 8-bit bytes. This makes for a total message length of 156 bits, or 390 mS.

In accordance with an example embodiment, the Hopped FSK (HFSK) alternates between four frequencies, F1, F2, F3, and F4, with a change in frequency indicating a new bit. In an example embodiment, frequencies F1 and F2 are utilized for a Zero bit, and frequencies F3 and F4 are utilized for a One bit, excepting during the preamble and sync patterns at the start of the message. In this example embodiment, successive Zero bits, whether interspersed with One bits or not, alternate between using F1 and F2, and One bits similarly alternate between using F3 and F4. In the packet portion of the message, the first Zero bit will use F1, and the first One bit will use F3. An example of a simple bit pattern of 10100011 is shown in the below table:

| BIT # | VALUE | FREQUENCY |
| --- | --- | --- |
| 1 | 1 | F3 |
| 2 | 0 | F1 |
| 3 | 1 | F4 |
| 4 | 0 | F2 |
| 5 | 0 | F1 |
| 6 | 0 | F2 |
| 7 | 1 | F3 |
| 8 | 1 | F4 |

In this example embodiment, the HFSK preamble is a steady tone of frequency F1 which lasts for eight (8) bit times. In this example embodiment, the HFSK sync pattern consists of four (4) bit times, using the frequencies F4, F2, F4, F2. This sequence of frequencies violates the HFSK standard described herein, and is therefore unique to the sync field.

This provides for increased security in communication two ways. The first is that bit timing is no longer required to be held in tight tolerance, because the arrival of the next data bit is signaled by the change in carrier frequency. The second is that only two of the four frequencies are valid for the next arriving bit. An incorrectly received/decoded frequency can be detected early, thereby invalidating the message even before the hash check is performed.

In this example embodiment, the FSK uplink message may begin with a preamble of 8 bits, a sync of one bit, and the packet may consist of eighteen (18) 8-bit bytes, for a total message length of 153 bits, or 459 mS. In this example embodiment, the FSK uplink messages use Manchester encoding, such that the first half of each bit is either the upper or lower frequency, and the second half of the bit is the other frequency. Zero bits begin with the lower frequency, and One bits begin with the upper frequency. In this example embodiment, the FSK preamble consists of eight (8) Zero bits. In this example embodiment, the FSK sync is a One bit. In this example embodiment, for FSK, the bit after the first One bit (the sync) marks the start of the packet, and is the most significant bit of the first packet byte.

In this example embodiment, for both FSK and HFSK, within each packet, there is a <Sequence> area intended to be used by the sending program in order to synchronize sent packets with received packets. Therefore, the sending program is configured to keep this a unique value in order to determine how to match up a response with a previously sent command. In this example embodiment, the format of all messages to and from the surface controller and the downhole device are as follows: <PREAMBLE>, <SYNC>, <TYPE>, <ADDRESS>, <SEQUENCE>, <CMD>, <DATA>, and <HASH>. Where:

| TYPE | SIZE (bits) | DESCRIPTION |
|---|---|---|
| PREAMBLE | 8 | Preamble depends on HFSK or FSK modulation |
| SYNC | 1 or 4 | Sync depends on HFSK or FSK modulation |
| TYPE | 8 | Device Type (0x01 = AS-100) |
| ADDRESS | 24 | Unique Address of the Device (0xFFFFFF = broadcast) |
| SEQUENCE | 12 | Sequence number for returned data packet. Allows Master to sync the response with the transmitted packet |
| CMD | 4 | 16 allowable commands per device type. The command bits occupy the low 4 bits of the second Sequence byte |
| DATA | 32 | Data specific to command |
| HASH | 64 | Hash of the data from the TYPE/ADDRESS to the DATA in the packet |

In an example embodiment, the Command may comprise one of the following: request device ID and version; Poll device for status; Downstream Switch Enable (DSSE); Arm Detonator; and Fire. The DSSE command may be configured to cause the downhole device to reply to this command and then sleep after activating a downstream switch. The ARM command may activate safety hardware circuitry to enable the FIRE command. The FIRE command may supply a frequency out to a charge pump circuit, enabling a detonation voltage for up to a programmable "nn" seconds. Although several example HFSK and FSK transport protocols have been disclosed herein, other formats for HFSK and FSK communication may be used.

Method

Figure 2:
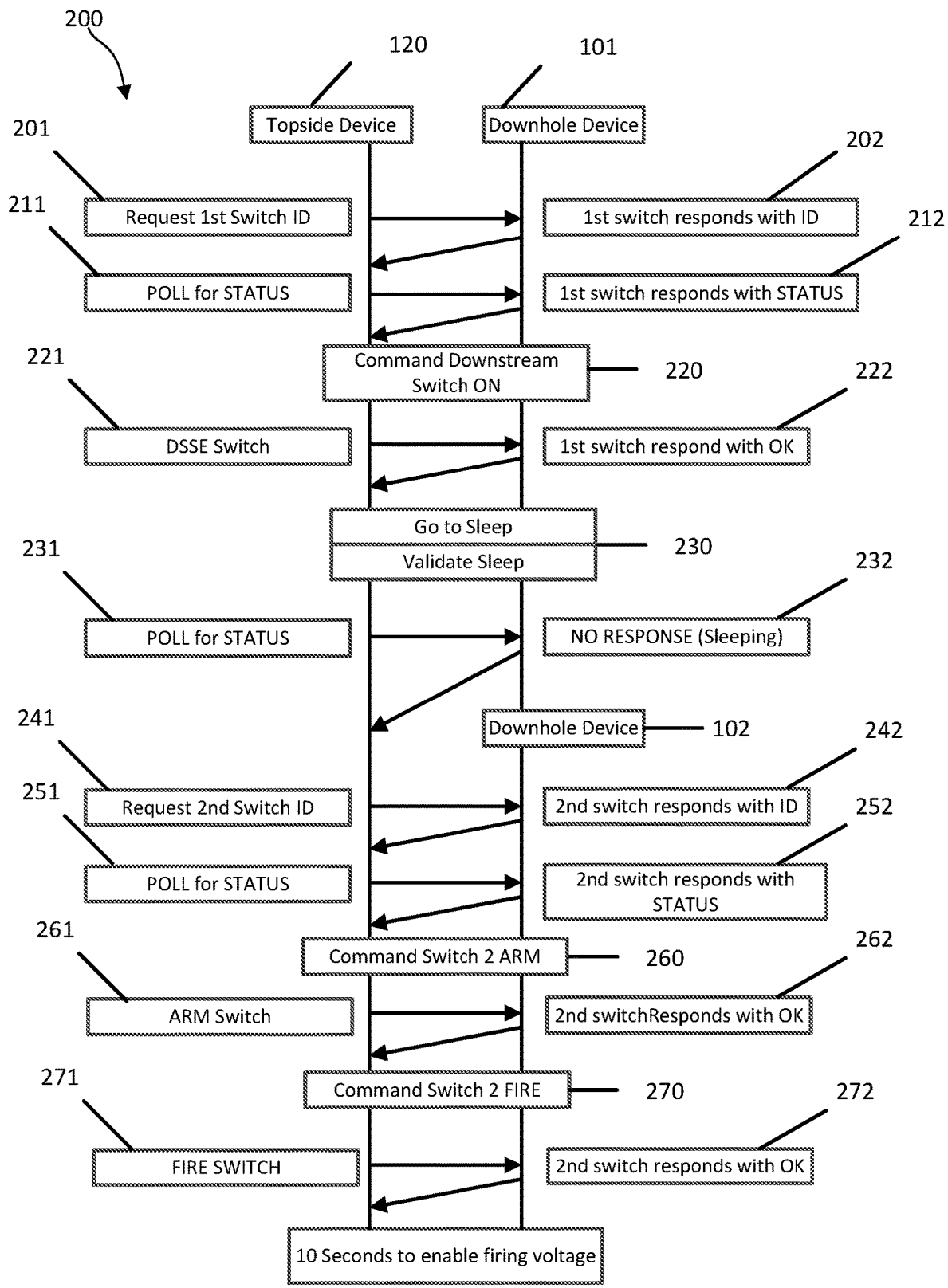
FIG. 2 is a diagram of a communications method for the well boring system of FIG. 1.

With reference now to FIG. 2, an example method 200 of communicating with two or more downhole devices is illustrated. In this method 200, a first downhole device 101 is identified, polled, and commanded to open communication to a second downhole device 102. The second downhole device 102 is identified, polled, armed, and commanded to fire. This example method 200 may be described in more detail as follows.

Method 200 may comprise sending (201), from a surface device to a first switch associated with the first downhole device 101, an ID Command requesting a first switch identification (ID). Method 200 may further comprise the first switch responding (202) with its ID. The ID command may be sent as a broadcast for the purpose of retrieving the unique ID of the downhole device. If the ID command has a specific address, then the downhole device may report version information as a response.

Method 200 may further comprise sending (211), from the surface device to the first switch, a POLL Command requesting a first switch STATUS. Method 200 may further comprise the first switch responding (212) to the POLL command with the temperature, voltage, sensor, and bit status of the specific downhole device. By polling a first downhole device 101, a user may obtain the temperature, voltage, sensor, and bit status without removing the first downhole device 101 from the ground and with without disconnecting the first downhole device 101 from the rest of the system in order to test it.

Method 200 may further comprise the surface device 120 commanding (220) a downstream switch to turn on. In an example embodiment, a first switch is associated with downhole device 101 and a downstream switch is associated with a downhole device 102 that is next in line on the wireline. In this example embodiment, the surface device may command the first switch to turn on the downstream switch. Stated another way, the first switch (upstream switch) may be commanded to enable communication with the downstream switch. Thus, method 200 may comprise sending (221), from the surface device to the first switch, a Downstream Switch Enable (DSSE) Command that may be configured to cause the first switch to allow downstream communications from the first switch to a lower device in the toolstring. The method 200 may comprise the downhole device responding (222) with an OK, indicating that the instruction has been received and acted upon.

Method 200 may further comprise the surface device 120 confirming (230) that the first switch is in sleep mode, and then communicating with the downstream switch. For example, method 200 may comprise polling (231), from the surface device 120, the status of the first switch. Method 200 may comprise the first switch responding (232) with its status. In this example, it is expected that the first switch would now not respond because it is sleeping. If it responds, then an error signal may be generated and the system reset (power to the toolstring cycled off and on). This step helps ensure that communications only occur with one switch at a time.

Assuming no response is received, indicating that the first switch is sleeping, method 200 may further comprise sending (241), from a surface device to the downstream switch, an ID Command requesting the downstream switch identification (ID). Method 200 may further comprise the downstream switch responding (202) with its ID, as described above in connection with the first switch ID response.

Method 200 may further comprise sending (251), from the surface device to the downstream switch, a POLL Command requesting the downstream switch STATUS. Method 200 may further comprise the downstream switch responding (252) to the POLL command with the temperature, voltage, sensor, and bit status of the specific downstream downhole device.

Method 200 may further comprise the surface device 120 commanding (260) the downstream switch to arm. For example, method 200 may comprise sending (261), from the surface device 120 to the downstream switch, an ARM command. The method may further comprise the downstream switch responding (262) with OK to confirm success in arming at that switch.

Method 200 may further comprise the surface device 120 commanding (270) the downstream switch to fire. For example, method 200 may comprise sending (271), from the surface device 120 to the downstream switch, a FIRE command. The FIRE command is configured to enable the firing circuit. In an example embodiment, the ARM command will have been performed prior to this or the FIRE command will be ignored. Once the FIRE command has been received, the downstream switch will have a window of a programmable "nn" seconds to see the firing voltage for the detonator. This allows the firing voltage time to ignite the detonator. The method may further comprise the downstream switch responding (272) with OK to confirm success in enabling the fire circuit at that switch.

It is noted that these responses described herein may each include the unique ID of the device and a sequence for matching the request with the response. Therefore, the confirmation is secure, confirming that the intended switch got the intended message.

Thus, the methods disclosed herein facilitate controlling voltage directed to individual perforating guns in a downhole system. This select-arm-fire perforating method includes intelligent electronic circuits with unique digital addresses that can be addressed through simple telemetry systems. The system includes a surface panel (surface device) that can communicate with each of the downhole circuits on the individual downhole devices. Through the surface panel, the wireline operator can identify each of the gun modules, determine their status, and then control the circuits to direct voltage to a detonator connected to the appropriate digital switch.

Circuitry

In an example embodiment, the downhole device comprises an addressable switch (AS) 400. AS 400 may be electrically connected via wireline 410 to the surface device 120 (FIG. 1). AS 400 may also be electrically connected via the wireline 410 to another AS downstream from AS 400. AS 400 is configured to receive power and to communicate downlink/uplink with surface device 120 (FIG. 1). AS 400 is further configured to pass through power and communications to downstream addressable switches when AS 400 is in sleep mode.

In an example embodiment, AS 400 may comprise a downstream switch 401, a processor 402, safety circuitry 403, a charge pump 404, and a detonate switch 405. AS 400 may be electrically coupled to a detonator 406. Processor 402 is connected to wireline 410 to communicate uplink/downlink with surface device 120 (FIG. 1). In an example embodiment, safety circuitry 403 is a latch.

Arm Circuitry

In an example embodiment, processor 402 is further connected to safety circuitry 403. In this example embodiment, processor 402 is configured to send a signal to safety circuitry 403 to arm the detonators. Safety circuitry 403 is configured to power up in the reset (safe) state. The removal of the signal, or a reset of the processor, will reset the safety circuit. In an example embodiment, the safety circuitry 403 is a latch circuit, and the latch circuit may be 'set' by the ARM command before the FIRE command is sent.

Special Fire Circuitry

In an example embodiment, processor 402 is further connected to charge pump 404. Charge pump 404, in an example embodiment, may comprise a capacitor, a charging resistor, and a bleeding resistor. Charge pump 404 is configured to begin charging the capacitor when the latch is armed and a FIRE command is received. Charge pump 404 will discharge the capacitor through bleeding resistor, if the safety circuitry 403 is ever disarmed.

When the FIRE command is received, and safety circuitry 403 has been previously armed, the charge pump 404 is energized by the processor for a programmable number of seconds, as prescribed in the FIRE command. After this, the processor may be configured to shut down and the firing transistor may be disabled with 50 milliseconds or for any other suitable period. If the top-side control rack does not ignite the detonator before the programmable "nn" seconds are complete, then firing is not possible and the system is again 'safe'. The system may be power-cycled and re-armed before another FIRE command can be successful.

If, at the time a FIRE command is received, safety circuitry 403 is not armed, the charge pump is prevented from functioning. In addition, detonate switch 405 not only requires the charge pump voltage to be above 4 volts, but also requires the wireline supply voltage, on wireline 410, to be greater than 60 volts dc. A wireline voltage of less than 60 volts dc keeps a firing transistor (in the detonate switch 405) disabled, even if the safety circuitry 403 and charge pump 404 have been properly driven.

Therefore, AS 400 forces the firing transistor into the disabled state, even if it has previously received the proper ARM and FIRE commands. This prevents an accidental firing of downhole device 101 when further down-hole devices are being powered.

Moreover, AS 400 may comprise a temperature sensing circuit. The temperature sensing circuit may communicate with processor 402, which may prevent firing if the sensed temperature is less than a set point temperature (e.g., if the temperature is less than 150 degrees F.). Moreover, any suitable temperature threshold can be used. The point is that the temperature will be relatively high when the device is underground, so it increases safety to prevent detonation when the temperatures are at ambient temperatures, but rather to allow detonation only when the device is at elevated temperature and therefore, underground.

In addition, AS 400 may be configured to sense whether a 50 ohm load is on the detonator, and to only allow firing if that load is present. The AS 400 may further be configured to test for continuity between the wires dedicated to the detonator. For example, the AS 400 safely determines, with very low current, if the detonator is connected or not. This is needed to remain within the safe operating area (SOA) of the detonator.

Figures 5, 6, 7:
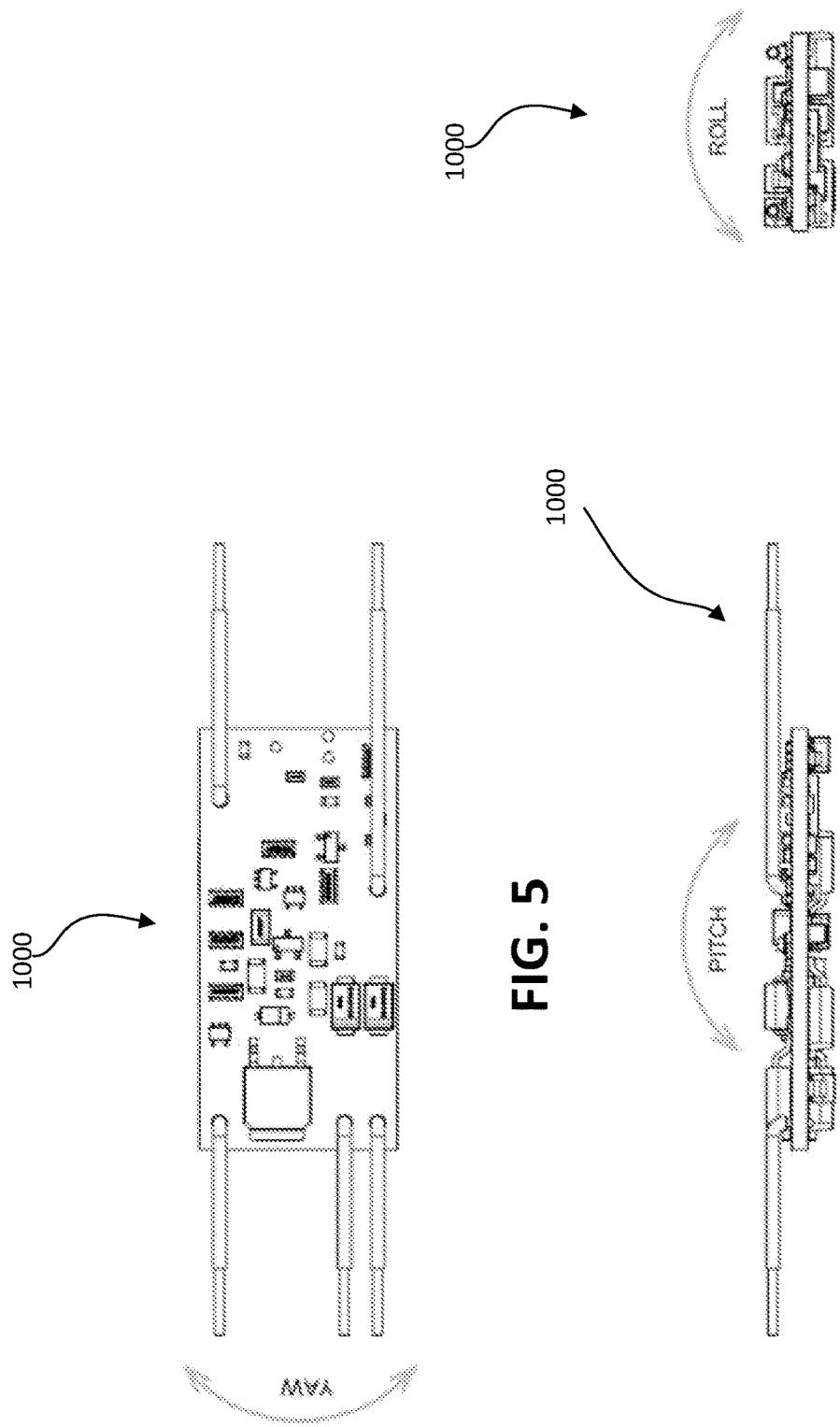
FIG. 5 is a top view of a circuit board in accordance with aspects of the invention.
FIG. 6 is a side view of the circuit board of FIG. 5.
FIG. 7 is an end view of the circuit board of FIG. 5.

In addition, AS 400 may be configured to sense one or more of roll, pitch and yaw by incorporating an accelerometer integrated circuit IC chip, or other suitable sensor(s) on the printed circuit board assembly 1000, which is shown in FIGS. 5-7. Circuit board 1000 is positioned in the downhole device, which is preferably a gun tube, or inside of the outer casing surrounding the gun tube. The accelerometer or other sensor(s) can determine the position of the downhole device inside of a wellbore with respect to one or more of: yaw (shown in FIG. 5), pitch (shown in FIG. 6), and roll (shown in FIG. 7). The measured position can be used to determine the shape charge angle and position prior to firing the charges, as further described in application Ser. No. 16/293,532. The measured position information can be relayed through a wired connection or wirelessly to a human or machine operator, which may be surface device 120. The position of the downhole device can preferably be altered by the operator, such as by sending a signal to circuit board 1000, which could then operate a motor on one or both ends of the downhole device to move the downhole device in the wellbore.

In addition, AS 400 may be configured to log and transmit detonation or g-force data received from downstream addressable switches' accelerometers before they are destroyed in the detonation process. Typical accelerometer measurements may include static or dynamic acceleration forces, vibrations, or continuous forces e.g. gravity. These data points may be evaluated and may enable more robust electronic designs to be created.

Using Systems, Devices, and Methods of this Disclosure

In various example embodiments, the system and method improve reliability and safety. For example, during pre-run checks, usually done above ground, the addressable switches can be polled with a test panel to verify their status and verify circuit integrity to insure the tool assembly is wired correctly and all components are working properly. Each of the addressable switches can also be checked while being positioned in the wellbore to continuously verify the integrity of the electrical circuit. Thus, the addressable switches can be addressed, and their status verified at any point before by surface test panels, or when positioned in the wellbore by the wireline communications system. In the event of a system failure (leaking cable-head, shorted wireline, failed casing collar locator (CCL), pinched gun wire, bad switch, etc.), the tool assembly can be repaired before pumping to total depth and attempting to set a plug or fire a gun. This contrasts with traditional pressure switches, which are passive and cannot be tested above ground or checked downhole.

The system and method may accomplish one or more of the following: reduce failed runs, minimize the potential for stuck tools, and significantly reduce non-productive time. Also, sticking and leaving tool strings in horizontal wells can be expensive, and POOH (pulling out of hole) after a failed pump-down run to bottom on a long lateral can be very undesirable.

Furthermore, a system, device, and/or method may further provide real-time feedback of the detonation event. This helps the wireline operator know with some certainty if a plug sets or a perforating gun fires. Prior techniques to verify downhole detonation included surface measurements that were not reliable. This downhole shot detection, unlike the pressure switch technology that fired bottom up in sequence, allows the wireline operator to bypass a failed gun and shoot the next gun in sequence. A detonation event may occur with one less gun, and this may be adequate to complete a stage of detonation. By being able to detonate even with a failed gun on the toolstring, the number of failed runs may be reduced and run efficiency may be improved.

Therefore, in various example embodiments of the system, devices, and/or method disclosed herein, any one or more of the following benefits may be realized.

Plug and perforation operations are able to safely control and selectively apply voltage to individual downhole devices in a downhole wireline assembly with single trip wireline runs through use of addressable switches. Addressable switches, according to this disclosure, may provide the ability to block inadvertent current from the electrical detonators in the tool string. This may include one or more sources of voltage: stray, RF signal and/or human error. The switches, when integrated with standard detonators, may be certified RF safe, so a RF-free perimeter at the well-site may be unnecessary. This may reduce the amount of time it takes to set up a site prior to drilling.

The wireline operator may communicate with and control each of the sections of the downhole assembly. The new switches may be checked before and during the wireline run, thus improving reliability. Real-time shot detection may give the operator immediate feedback on whether plugs have set or guns have fired. Individual gun sections may be skipped in the event any section fails to detonate, which may prevent a mis-run and result in better efficiency.

In accordance with various embodiments, the systems and methods described herein can improve reliability, safety and efficiency in making and using the system 100. In an example embodiment, the system 100 can reduce costs attributable to failed runs, reduce costs associated with tools being stuck, reduce fishing and well remediation, generate a higher rate of return, and prevent surface detonations and loss of life.

In accordance with various embodiments, the system may be tested above ground without removing any devices from the system. Similarly, the system may be tested below ground. A downhole device may remain on the toolstring and provide various data to a user above ground as to the status of the downhole device and whether it has detonated. By being able to test downhole devices on the line, the downhole device as tested may be the downhole device as used. In other words, in an example embodiment, no connections changes are made between above ground testing, below ground testing, and operating a downhole device, which may provide greater reliability of a downhole device.

The integrated protection circuits may block the unintended flow of electricity through an addressable switch and may stop inadvertent voltage from initiating a detonator.

A method of communicating between a surface device and two or more downhole devices is disclosed herein. The method may comprise identifying a first downhole device; polling the first downhole device; commanding opening of communication to a second downhole device; identifying the second downhole device; polling the second downhole device; arming the second downhole device; and commanding the second downhole device to fire, wherein the communicating between the surface device and the two or more downhole devices occurs via a Hopped Frequency Shift Keying (HFSK) voltage-modulated signal.

Having thus described different embodiments, other variations and embodiments that do not depart from the spirit of this disclosure will become apparent to those skilled in the art. The scope of the claims is thus not limited to any particular embodiment, but is instead set forth in the claims and the legal equivalents thereof. Unless expressly stated in the written description or claims, the steps of any method recited in the claims may be performed in any order capable of yielding the desired product. No language in the specification should be construed as indicating that any non-claimed limitation is included in a claim. The terms "a" and

"an" in the context of the following claims are to be construed to cover both the singular and the plural, unless otherwise indicated.

What is claimed is:

1. An addressable switch positioned in a first downhole device, wherein the addressable switch comprises:
   an electrical input and an electrical output, the electrical input being configured to communicate with a surface controller when a unique address is received by the electrical input from the surface controller; and
   a downstream switch configured to connect or disconnect the electrical input to the electrical output when the unique address is received by the electrical input;
   a safety circuitry;
   a processor in electrical communication with the downstream switch and the safety circuitry, the processor being configured to send a signal to the safety circuitry to arm a detonator,
   wherein a downlink communication between the surface controller and the electrical input occurs via Hopped Frequency Shift Keying (HFSK) voltage-modulated signals, and
   wherein the addressable switch is configured to transition between a connecting state and a blocking state in response to a first command from the surface controller, and
   when the addressable switch is in the connecting state, and a second addressable switch positioned in a second downhole device is in the blocking state, the surface controller is configured to exclusively communicate with the second downhole device.

2. The addressable switch of claim 1, wherein the downlink communication uses voltage modulation at four different frequencies.

3. The addressable switch of claim 1, wherein a transport layer comprises a bit-stream with bits including a Preamble, Sync, and Data Packet.

4. The addressable switch of claim 3, wherein the Data Packet comprises one or more of following fields: Type, Address, Sequence, Command, Data, and Hash.

5. The addressable switch of claim 4, wherein the Command comprises at least one of following: request device ID and version; Poll device for status; Downstream Switch Enable (DSSE); arm the detonator; and FIRE.

6. The addressable switch of claim 3 wherein the HFSK voltage-modulated signals alternates between four frequencies, F1, F2, F3, and F4, with a change in frequency indicating a new bit.

7. The addressable switch of claim 3, wherein frequencies F1 and F2 are utilized for a Zero bit, and wherein frequencies F3 and F4 are utilized for a One bit, excepting during the Preamble and the Sync.

8. The addressable switch of claim 3, further comprising an oscillator configured to be tuned to a reference signal.

9. The addressable switch of claim 3, wherein the Preamble is configured to provide a reference signal based on a minimum frequency deviation from a plurality of frequency deviations between an expected frequency from the surface controller and an internally generated frequency in an oscillator.

10. The addressable switch of claim 1, wherein the surface controller is configured to send downlink communication signals to the second downhole device.

11. The addressable switch of claim 10, wherein the first downhole device is a downhole gun comprising a shaped charge, and the detonator.

12. The addressable switch of claim 1, wherein when the addressable switch is in the blocking state the surface controller is configured to exclusively communicate with the addressable switch.

13. The addressable switch of claim 1, wherein the surface controller is configured to transition the addressable switch from the connecting state to a sleeping mode.

14. The addressable switch of claim 1, wherein the addressable switch is configured to communicate via a wireline connection.

15. The addressable switch of claim 14, wherein the addressable switch and the surface controller are each configured to communicate via Frequency Shift Keying (FSK) current-modulated signals.

16. The addressable switch of claim 14, wherein the wireline communication system is half-duplex.

\* \* \* \* \*